United States Patent
Stanhope et al.

(10) Patent No.: US 11,713,117 B2
(45) Date of Patent: Aug. 1, 2023

(54) SYSTEM AND METHOD FOR ANCHORING UNMANNED AERIAL VEHICLES TO SURFACES

(71) Applicant: CNH Industrial America LLC, New Holland, PA (US)

(72) Inventors: Trevor Stanhope, Palos Hills, IL (US); Darian E. Landolt, Evanston, IL (US)

(73) Assignee: CNH Industrial America LLC, New Holland, PA (US)

( * ) Notice: Subject to any disclaimer, the term of this patent is extended or adjusted under 35 U.S.C. 154(b) by 532 days.

(21) Appl. No.: 16/836,251

(22) Filed: Mar. 31, 2020

(65) Prior Publication Data

US 2021/0300547 A1    Sep. 30, 2021

(51) Int. Cl.

| | |
|---|---|
| *B64C 39/02* | (2023.01) |
| *B64F 1/12* | (2006.01) |
| *A01B 76/00* | (2006.01) |
| *B64F 1/16* | (2006.01) |
| *G05D 1/10* | (2006.01) |
| *F16B 1/00* | (2006.01) |

(Continued)

(52) U.S. Cl.
CPC .............. *B64C 39/02* (2013.01); *A01B 76/00* (2013.01); *B64F 1/12* (2013.01); *B64F 1/16* (2013.01); *F16B 1/00* (2013.01); *G05D 1/102* (2013.01); *B64U 70/00* (2023.01); *B64U 80/86* (2023.01); *B64U 2101/00* (2023.01); *F16B 2001/0035* (2013.01)

(58) Field of Classification Search
CPC .............. B64C 39/02; B64C 2201/12; B64C 2201/18; B64C 2201/208; B64C 25/68; B64C 39/024; A01B 76/00; B64F 1/12; B64F 1/16; F16B 1/00; F16B 2001/0035; G05D 1/102
See application file for complete search history.

(56) References Cited

U.S. PATENT DOCUMENTS

| | | | | |
|---|---|---|---|---|
| 4,015,366 | A | * | 4/1977 | Hall, III ................... A01G 3/04 |
| | | | | 193/25 E |
| 2005/0178172 | A1 | * | 8/2005 | McGettrick ............... E05B 9/08 |
| | | | | 70/58 |

(Continued)

FOREIGN PATENT DOCUMENTS

| | | |
|---|---|---|
| DE | 102014201203 A1 | 7/2015 |
| GB | 2533140 A | 6/2016 |

(Continued)

*Primary Examiner* — Donald J Wallace
*Assistant Examiner* — Jalal C Coduroglu
(74) *Attorney, Agent, or Firm* — Rebecca L. Henkel; Rickard K. DeMille

(57) ABSTRACT

A system for anchoring unmanned aerial vehicles to surfaces includes a landing pad configured to be installed on an agricultural machine, with the landing pad defining a landing surface. Furthermore, the system includes an unmanned aerial vehicle (UAV) configured to land on the landing surface and a top surface of a field across which the agricultural machine is traveling. The UAV, in turn, includes an anchoring device configured to engage soil within the field to anchor the UAV to the field when the UAV has landed on the top surface of the field. Additionally, the anchoring device is further configured to engage the landing pad to anchor the UAV to the landing surface when the UAV has landed on the landing pad.

20 Claims, 7 Drawing Sheets

(51) Int. Cl.
    *B64U 70/00*          (2023.01)
    *B64U 80/86*          (2023.01)
    *B64U 101/00*        (2023.01)

(56) References Cited

U.S. PATENT DOCUMENTS

| | | | |
|---|---|---|---|
| 2012/0036797 A1* | 2/2012 | Ardern | E04H 12/2223 52/157 |
| 2016/0144982 A1* | 5/2016 | Sugumaran | A01D 41/12 244/108 |
| 2017/0190260 A1* | 7/2017 | Wang | B64C 29/0016 |
| 2018/0156770 A1 | 6/2018 | Saez et al. | |
| 2018/0338422 A1 | 11/2018 | Brubaker | |
| 2018/0340377 A1* | 11/2018 | Eggers | E21B 17/046 |
| 2018/0356545 A1 | 12/2018 | Puntous et al. | |
| 2018/0364157 A1 | 12/2018 | Ghiraldi et al. | |
| 2019/0002128 A1* | 1/2019 | Raz | B64C 39/024 |
| 2019/0202554 A1* | 7/2019 | Bosworth | B64C 25/32 |
| 2020/0255140 A1* | 8/2020 | Nahuel-Andrejuk | A01B 79/005 |
| 2020/0346736 A1* | 11/2020 | Krasnoff | B64C 27/52 |
| 2021/0087768 A1* | 3/2021 | Williamson | E02D 5/54 |
| 2021/0094687 A1* | 4/2021 | Brock | B64C 39/022 |
| 2021/0229807 A1* | 7/2021 | Ballerini | B64C 39/024 |
| 2021/0405654 A1* | 12/2021 | Ulun | G05D 1/101 |

FOREIGN PATENT DOCUMENTS

| | | | |
|---|---|---|---|
| KR | 101787660 B1 | 10/2017 | |
| WO | WO-2019182521 A1 * | 9/2019 | B64C 39/024 |

\* cited by examiner

SYSTEM AND METHOD FOR ANCHORING UNMANNED AERIAL VEHICLES TO SURFACES

FIELD OF THE INVENTION

The present disclosure generally relates to unmanned aerial vehicles and, more particularly, to systems and methods for anchoring unmanned aerial vehicles to surfaces, such as landing surface of a landing pad and a top surface of a field.

BACKGROUND OF THE INVENTION

Recently, advancements in unmanned aerial vehicle (UAV) technologies have enabled the integration of UAVs into modern farm management practices. For example, a UAV may be flown across a field and landed at one or more data collection points within the field. Once landed at a data collection point, the UAV may capture data indicative of one or more characteristics of the field, such as the soil hardness, soil moisture, and/or the seedbed floor depth. Capturing such field characteristic data, in turn, often requires penetrating the soil with a pin or other probe-like tool that extends relative to the UAV. However, this penetration of the tool into the soil results in reactive force being applied to the UAV. Given the light weight of the typical UAV, this reactive force may cause the UAV to lift off the field surface, thereby resulting in the capture of inaccurate field characteristic data.

Accordingly, an improved system and method for anchoring unmanned aerial vehicles to surfaces would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for anchoring unmanned aerial vehicles to surfaces. The system includes a landing pad configured to be installed on an agricultural machine, with the landing pad defining a landing surface. Furthermore, the system includes an unmanned aerial vehicle (UAV) configured to land on the landing surface and a top surface of a field across which the agricultural machine is traveling. The UAV, in turn, includes a body and a plurality of legs coupled to the body, with the plurality of legs configured to support the body relative to the landing surface or the top surface of the field when the UAV is in a landed position. Moreover, the UAV further includes an anchoring device configured to engage soil within the field to anchor the UAV to the field when the UAV has landed on the top surface of the field. Additionally, the anchoring device is further configured to engage the landing pad to anchor the UAV to the landing surface when the UAV has landed on the landing pad.

In another aspect, the present subject matter is directed to a method for anchoring unmanned aerial vehicles to surfaces. The method includes controlling, with a computing system comprising one or more computing devices, an operation of an anchoring device of a UAV such that the anchoring device disengages a landing pad on which the UAV has landed to unanchor the UAV from a landing surface of the landing pad. Furthermore, the method includes controlling, with the computing system, an operation of a propulsion system of the UAV such that the UAV is flown relative to a field and landed at a data collection point within the field. Additionally, the method includes controlling, with the computing system, the operation of the anchoring device such that the anchoring device engages soil within the field to anchor the UAV to the field when the UAV has landed on the top surface of the field.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
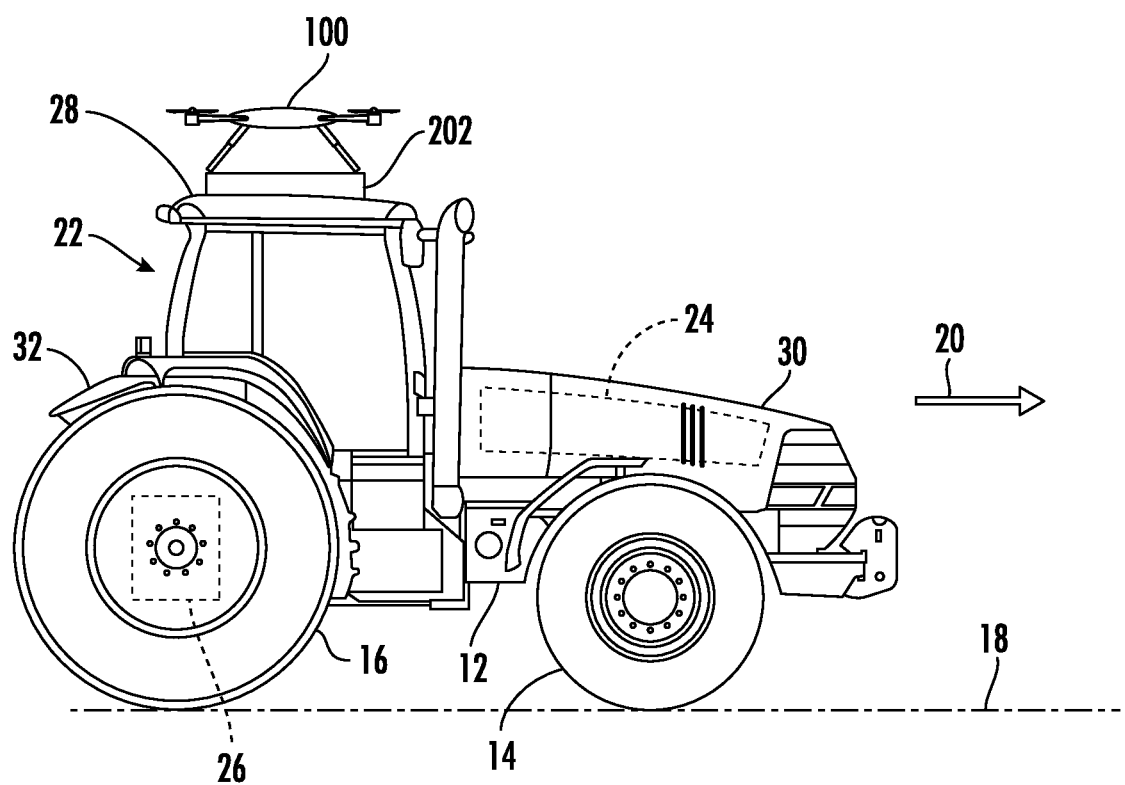
FIG. 1 illustrates a side view of one embodiment of an agricultural machine in accordance with aspects of the present subject matter, particularly illustrate a landing pad for an unmanned aerial vehicle (UAV) installed on the machine.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for anchoring unmanned aerial vehicles to surfaces. Specifically, in several embodiments, the disclosed system may include a landing pad configured to be installed on an agricultural machine, such as an agricultural tractor. For example, the landing pad may be installed on the roof, the hood, or a fender of the tractor. Furthermore, the system may include an unmanned aerial vehicle (UAV) configured to land on a landing surface of the landing pad and the top surface of the field across which the agricultural machine is traveling. The UAV may, in turn, include one or more anchoring devices configured to engage the soil within the field to anchor the UAV to the top surface of the field when the UAV has landed on the field. Moreover, the anchoring device(s) may be further configured to engage the landing pad to anchor the UAV to the landing surface when the UAV has landed on the landing pad.

The anchoring device(s) may have suitable configuration that allows such device(s) to engaging the soil within the field and the landing pad. For example, in one embodiment, each anchoring device may include an auger and an associated actuator (e.g., an electric motor). In this respect, each actuator may be configured to rotationally drive the corresponding auger such that the auger(s) rotationally engages the soil within the field and the landing pad. In another embodiment, each anchoring device may include an actuate member and an associated actuator (e.g., a solenoid). As such, each actuator may be configured to move the corresponding arcuate member between a first position at which the arcuate member engages the soil within the field or the landing pad and a second position at which the arcuate member is disengaged from the soil and the landing pad.

The anchoring device(s) of the UAV may provide one or more advantages. For example, the anchoring device(s) may anchor the UAV to the top surface of the field, thereby allowing pins or other data-gathering probes installed on the UAV to penetrate into the soil without lifting the UAV off the top field surface. Moreover, using the same anchoring device(s) to anchor the UAV to the field and the landing pad reduces the weight and complexity of the UAV. That is, there is no need for a first anchoring device(s) to anchor the UAV to the field and a second anchoring device(s) to anchor the UAV to the landing pad.

Referring now to the drawings, FIG. 1 illustrates a side view of one embodiment of an agricultural machine 10 in accordance with aspects of the present subject matter. As shown, in the illustrated embodiment, the agricultural machine 10 is configured as an agricultural tractor. However, in alternative embodiments, the agricultural vehicle 10 may correspond to any other suitable powered or unpowered agricultural machine or combination of machines (e.g., a tractor and an associated implement).

As shown, the agricultural machine 10 may include a frame or chassis 12 configured to support or couple to a plurality of components. For example, a pair of steerable front wheels 14 and a pair of driven rear wheels 16 may be coupled to the frame 12. The wheels 14, 16 may, in turn, be configured to support the agricultural machine 10 relative to a top surface 18 of a field and move the machine 10 in the direction of travel 20 across the field. Furthermore, the frame 12 may support an operator's cab 22 housing various input devices for permitting an operator to control the operation of one or more components of the machine 10. In addition, the agricultural machine 10 may include an engine 24 and a transmission 26 mounted on the frame 12. The transmission 26 may be operably coupled to the engine 24 and may provide variably adjusted gear ratios for transferring engine power to the driven wheels 16.

The configuration of the agricultural machine 10 described above and shown in FIG. 1 is provided only to place the present subject matter in an exemplary field of use. Thus, the present subject matter may be readily adaptable to any manner of machine configuration. For example, in one embodiment, the front wheels 14 of the vehicle 10 may be driven in addition to or in lieu of the rear wheels 16.

Moreover, a landing pad 202 may be installed on the agricultural machine 10. As will be described below, the landing pad 202 may define a landing surface 204 (FIG. 2) on which an unmanned aerial vehicle (UAV) 100 is configured to land. As such, the landing pad 202 may correspond to any suitable platform on which the UAV 100 can land and be supported after such landing. In the illustrated embodiment, the landing pad 202 is installed on a roof 28 of the cab 22. However, in alternative embodiments, the landing pad 202 may be installed at any other suitable location on the agricultural machine 10, such as on a hood 30 or a fender 32 of the machine 10.

Figure 2:
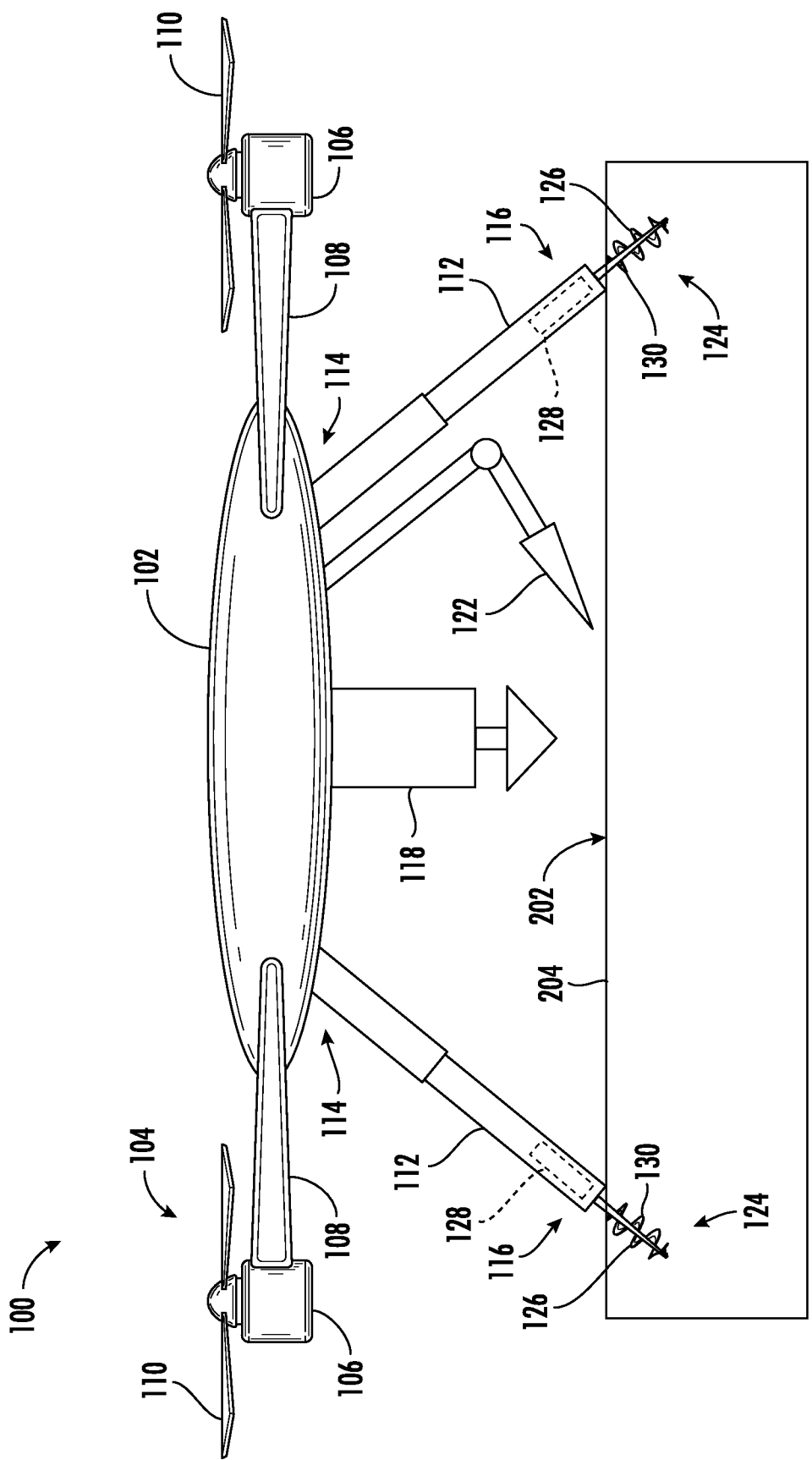
FIG. 2 illustrates a front view of one embodiment of a UAV in accordance with aspects of the present subject matter, particularly illustrating anchoring devices of the UAV engaging a landing pad to anchor the UAV to a landing surface of the landing pad.
Figure 3:
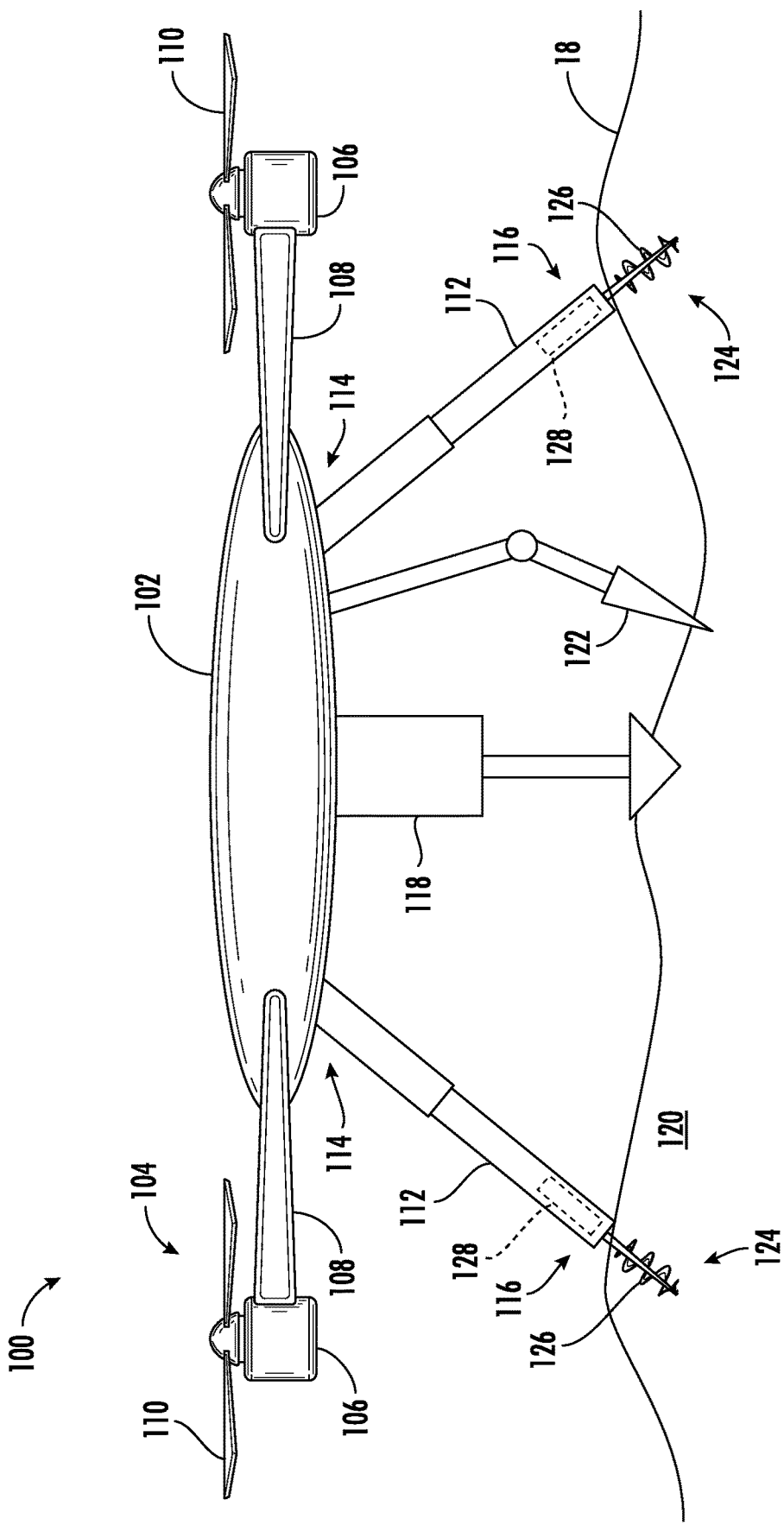
FIG. 3 illustrates another front view of the UAV shown in FIG. 2, particularly illustrating the anchoring devices of the UAV engaging the soil within a field to anchor the UAV to a top surface of the field.

Referring now to FIGS. 2 and 3, differing front views of one embodiment of an unmanned aerial vehicle (UAV) 100 are illustrated in accordance with aspects of the present subject matter. Specifically, FIG. 2 illustrates a front view of the UAV 100 when in a landed position on the landing pad 202. Additionally, FIG. 3 illustrates a front view of the UAV when in a landed position on a field.

As will be described below, the UAV 100 may be configured to take off from the landing pad 202, fly over a field (e.g., an agricultural field), and land at one or more data collection points within the field. After capturing data and/or soil samples at the data collection point(s), the UAV 100 may return to and land on the landing pad 202. As such, the UAV 100 may generally correspond to any suitable aerial vehicle capable of unmanned flight, such as any UAV capable of controlled vertical, or nearly vertical, takeoffs and landings. For example, in the illustrated embodiment, the UAV 100 is configured as a quadcopter. However, in alternative embodiments, the UAV 100 may be configured as any other multi-rotor aerial vehicle, such as a tricopter, hexacopter, or octocopter. In further embodiments, the UAV 100 may be configured as a single-rotor helicopter or a fixed wing, hybrid vertical takeoff and landing aircraft.

As shown in FIGS. 2 and 3, the UAV 100 may include various components that permit the UAV 100 to take off from the landing pad 202, fly across the field, and land at a data collection point. Specifically, in several embodiments, the UAV 100 may include a body or frame 102 that supports a propulsion system 104. For example, in one embodiment, the propulsion system 104 may include four motors 106 (two are shown in FIGS. 2 and 3), with each motor 106 coupled to the body 102 via a support arm 108. Each motor 106 may, in turn, be configured to rotationally drive an associated propeller 110. However, in alternative embodiments, the propulsion system 104 may have any other suitable configuration. For example, the propulsion system 104 may include fewer or more than four motors 16 and associated propellers 110.

Furthermore, the UAV 100 may include a plurality of legs 112. In general, as shown in FIG. 2, the legs 112 may be configured to support the body 102 relative to the landing surface 204 when the UAV 100 has landed on the landing pad 202. Moreover, as shown in FIG. 3, the legs 112 may also be configured to support the body 102 relative to the top surface 18 of the field when the UAV 100 has landed thereon (e.g., at a data collection point). In this respect, each leg 112 may extend between a proximal end 114 coupled to the body 102 and an opposed, distal end 116 positioned distal from the body 102. As such, the distal ends 116 of the legs 112 may contact the landing surface/top field surface 204/18 when the UAV 100 is in the landed position. Furthermore, in the illustrated embodiment, the legs 112 are configured to telescope or otherwise extend and retract, thereby permitting adjustment of the body 102 relative to the landing surface/top field surface 204/18 to be adjusted. Alternatively, the legs 112 may be non-telescoping and have a fixed length. Additionally, in one embodiment, the UAV 100 may include four legs 112 (two are shown in FIG. 1) extending outward from the body 102. However, in alternative embodiments, the UAV 100 may have any other suitable number of legs 112 and/or the legs 112 may have any other suitable configuration.

Moreover, in several embodiments, one or more sensors 118 may be supported on the UAV 100. In general, when the UAV 100 has landed at a data collection point within the field, the sensor(s) 118 may be configured to capture data indicative of one or more field characteristics of the field at such data collection point. For example, in the illustrated embodiment, the sensor 118 is configured as a cone penetrometer. In such an embodiment, the sensor 118 include a cone that is extended downward relative to the UAV body 102 such that the cone is pushed into soil 120 of the field (FIG. 3), thereby allowing data indicative of the soil hardness of the field to be captured. However, in alternative embodiments, the sensor(s) 118 may be configured as any other suitable type(s) of sensing device(s) that includes a pin or a probe-like component configured to be pushed into the soil 120 to allow the capture of field characteristic data. Moreover, the sensor(s) 118 may be configured to capture any other type(s) of field characteristic data, such as the top field surface profile, seedbed depth, soil moisture content, and/or the like.

Additionally, in some embodiments, the UAV 100 may include a soil sampling device 122 supported thereon. More specifically, when the UAV 100 has landed at a data collection point within the field, the soil sampling device 122 may be configured to obtain a sample or quantity of the soil present within the field. The soil sample may, in turn, be analyzed (e.g., after the UAV 100 has returned to the landing pad 202) to determine one or more field characteristics of the field at the data collection point where such sample was obtained. In this respect, the soil sampling device 122 may have any suitable configuration that allows the device 122 to obtain a sample of the soil. For example, in one embodiment, the soil sampling device 122 may be configured as a shovel coupled to an articulable arm that allows a quantity or sample of the soil to be lifted from the field and deposited within a storage chamber (not shown) of the UAV 100.

In accordance with aspects of the present subject matter, the UAV 10 may include one or more anchoring devices 124. More specifically, as shown in FIG. 2, the anchoring device(s) 124 may be configured to engage the landing pad 202 when the UAV 100 has landed on the landing pad 202. The engagement between the anchoring device(s) 124 and the landing pad 202 may, in turn, anchor or otherwise secure the UAV 100 to the landing surface 204 of the landing pad 202. Such anchoring may prevent the UAV 100 from falling off the landing pad 202, such as when the agricultural machine 100 encounters a bump or other surface irregularity. Furthermore, as shown in FIG. 3, the anchoring device(s) 124 may be configured to engage the soil 120 within the field when the UAV 100 has landed on the field (e.g., at a data collection point). The engagement between the anchoring device(s) 124 and the soil may, in turn, anchor or otherwise secure the UAV 100 to the field. In this respect, the anchoring device(s) 124 may improve the quality of the data captured sensor(s) 118 and/or allow the soil sampling device 122 to obtain a quantity of soil by preventing the UAV 100 from lifting off the top surface 18 of the field when the sensor(s) 118 and/or the soil sampling device 122 are pushed into the soil 120.

Additionally, the use of the same anchoring device(s) 124 to anchor the UAV 100 to both the landing pad 202 and the field may reduce the weight and complexity of the UAV 100. For example, there is no need for a first anchoring device(s) to anchor the UAV 100 to the field and a second anchoring device(s) to anchor the UAV 100 to the landing pad.

In several embodiments, the anchoring device(s) 124 may correspond to a rotary device(s) configured to rotationally engage the landing pad 202 and the soil 120 within the field. For example, in such embodiments, each anchoring device 124 may include an auger 126 rotatably coupled to the distal end 116 of one of the legs 112. Moreover, each anchoring device 124 may include an actuator 128 (e.g., an electric motor positioned within the corresponding leg 112 adjacent to its distal end 116) configured to rotationally drive the auger 126 relative to the corresponding leg 112. As such, when the UAV 100 lands on the landing pad 202 or the field, the each actuator 128 may rotationally drive the corresponding auger 126 such that the auger 126 is rotated into the a corresponding cavity 130 defined by the landing pad 202 or the soil 120 within the field, thereby anchoring or securing the UAV 100 to the landing pad/field. In one embodiment, the portion of the landing pad 202 defining the cavity(ies) 130 may be formed of a magnetic material. Additionally, in some embodiments, one anchoring device 124 may be provided in operative association with each leg 112 of the UAV 100. However, in alternative embodiments, the anchoring device(s) 124 may be provided in operative association with only some of the legs 112 (e.g., two of the four legs 112) or with another component of the UAV 100. For example, in one embodiment, a single anchoring device 124 may be coupled directly to the UAV body 102.

Figure 4:
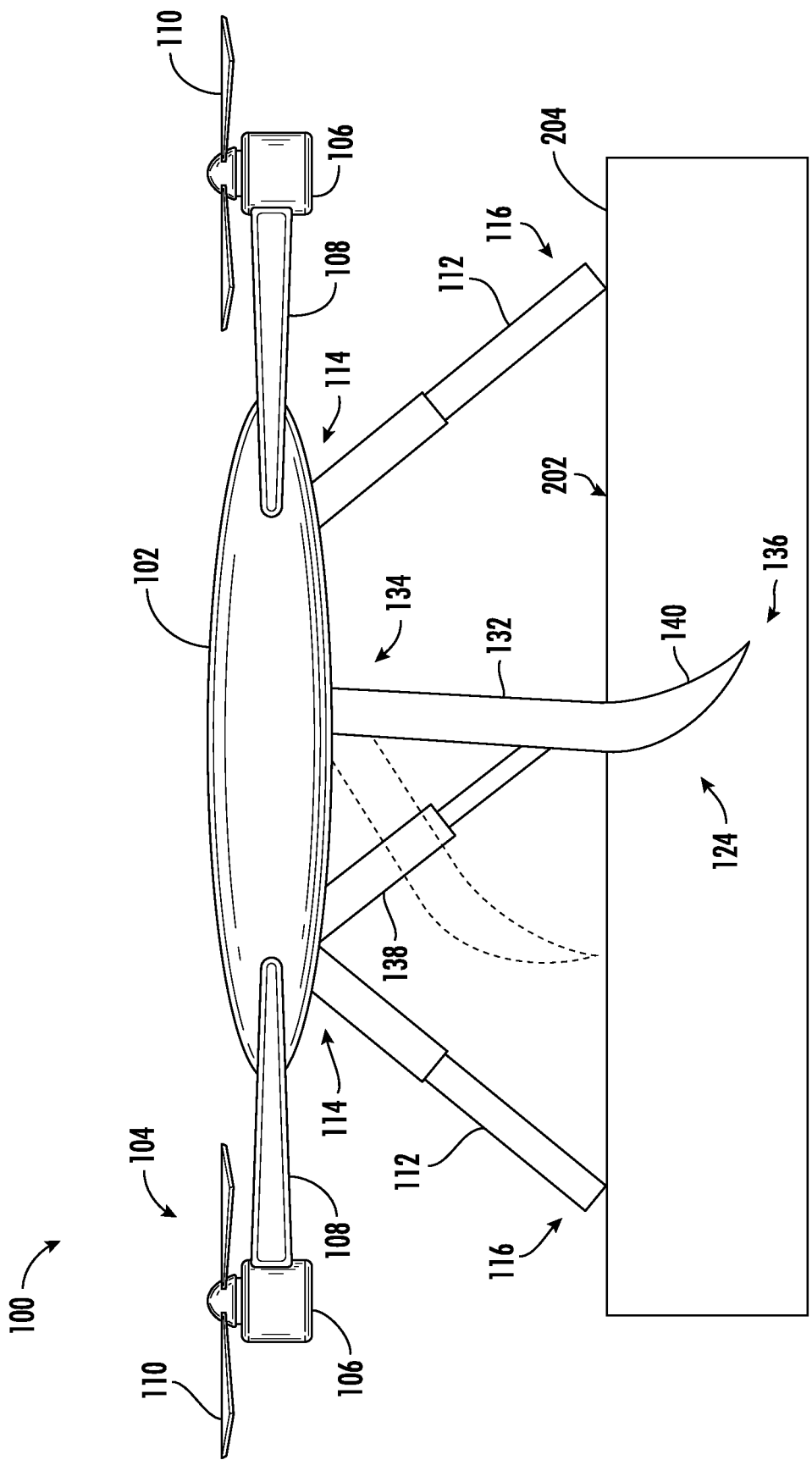
FIG. 4 illustrates a front view of another embodiment of a UAV in accordance with aspects of the present subject matter, particularly illustrating an anchoring device of the UAV engaging a landing pad to anchor the UAV to a landing surface of the landing pad.
Figure 5:
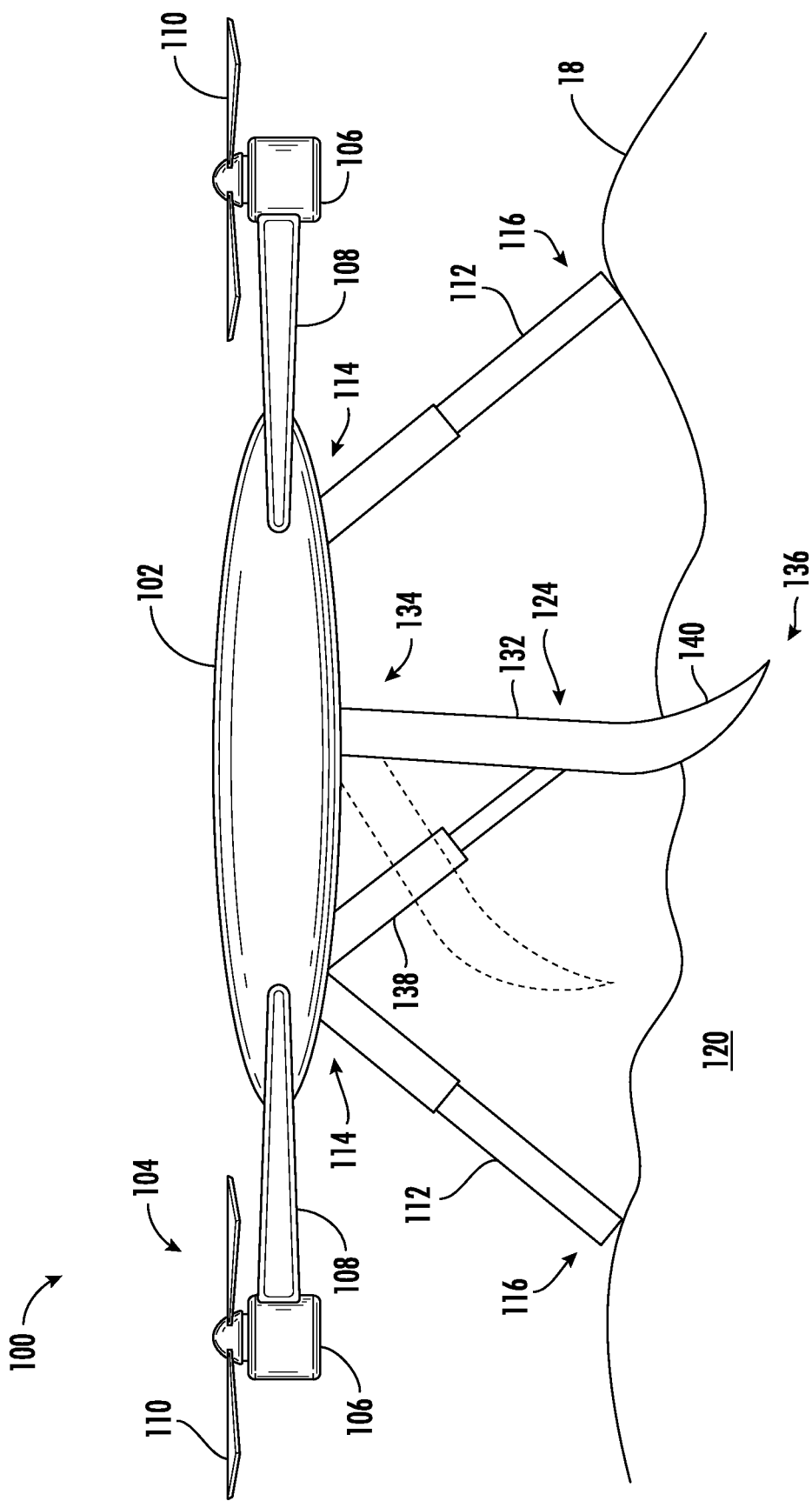
FIG. 5 illustrates another front view of the UAV shown in FIG. 4, particularly illustrating the anchoring device of the UAV engaging the soil within a field to anchor the UAV to a top surface of the field.

Referring now to FIGS. 4 and 5, differing front views of another embodiment of a UAV 100 are illustrated in accordance with aspects of the present subject matter. Specifically, FIG. 4 illustrates a front view of the UAV 100 when in a landed position on the landing pad 202. Additionally, FIG. 5 illustrates a front view of the UAV when in a landed position on a field. In general, the UAV 100 shown in FIGS. 4 and 5 is configured substantially similar to the UAV 100 shown in FIGS. 2 and 3. For example, the UAV 100 shown in FIGS. 4 and 5 includes a body 102, a propulsion system 104, and a plurality of legs 112. Although omitted for clarity, the UAV 100 shown in FIGS. 4 and 5 may also include the sensor(s) 118 and/or the soil sampling device 122 like the UAV 100 shown in FIGS. 2 and 3.

Additionally, like the UAV 100 shown in FIGS. 2 and 3, the UAV 100 shown in FIGS. 4 and 5 includes an anchoring device 124 configured to anchor or otherwise secure the UAV 100 to the landing pad 202 and the field. However, the anchoring device 124 shown in FIGS. 4 and 5 is not configured as a rotary device. Instead, shown in FIGS. 4 and 5, the anchoring device 124 includes an arcuate arm or member 132 extending between a proximal end 134 pivotably coupled to the UAV body 102 and an opposed distal end 136 positioned distal to the UAV body 102. In some embodiments, the distal end 136 of the arcuate member 132 may be configured as one or more tips (e.g., three talon-like tips)

configured to penetrate the top surface 18 of the field. Moreover, the anchoring device 124 may include an actuator 138 (e.g., an electric linear actuator coupled between the UAV body 102 and the arcuate member 132) configured to pivot the arcuate member 132 relative to the body 102. Specifically, the arcuate member 132 may be pivotable or otherwise moveable between a first position (shown in dashed lines in FIGS. 4 and 5) at which the arcuate member 132 is disengaged from the landing pad/field and a second position (shown in solid lines in FIGS. 4 and 5) at which the arcuate member 132 engages the landing pad/field. In this respect, as shown in FIG. 4, when the UAV 100 lands on the landing pad 202, the actuator 138 may pivot the arcuate member 132 from the first position to the second position such that a portion of the arcuate member 132 is received within a complementary cavity 140 defined by the landing pad 202. As such, the curved or arcuate nature of the arcuate member 132 may secure the UAV 100 to the landing pad 202. In one embodiment, the portion of the landing pad 202 defining the cavity(ies) 140 may be formed of a magnetic material. Similarly, as shown in FIG. 5, when the UAV 100 lands on the field (e.g., at a data collection point), the actuator 138 may pivot the arcuate member 132 from the first position to the second position such that tip of the arcuate member 132 pierces the top surface 18 of the field and penetrates into the soil 120. Thus, the curved or arcuate nature of the arcuate member 132 may secure the UAV 100 to the field. Although FIGS. 4 and 5 illustrate only a single anchoring device 124, the UAV 100 may include two or more anchoring devices 124.

In alternative embodiments, the anchoring device(s) 124 installed on the UAV 100 may have any other suitable configuration that allows such device(s) to anchor or otherwise secure the UAV to both the landing pad 202 and the field. Additionally, the configuration of the UAV 100 described above and shown in FIGS. 2-5 is provided only to place the present subject matter in an exemplary field of use. Thus, the present subject matter may be readily adaptable to any manner of UAV configuration.

Figure 6:
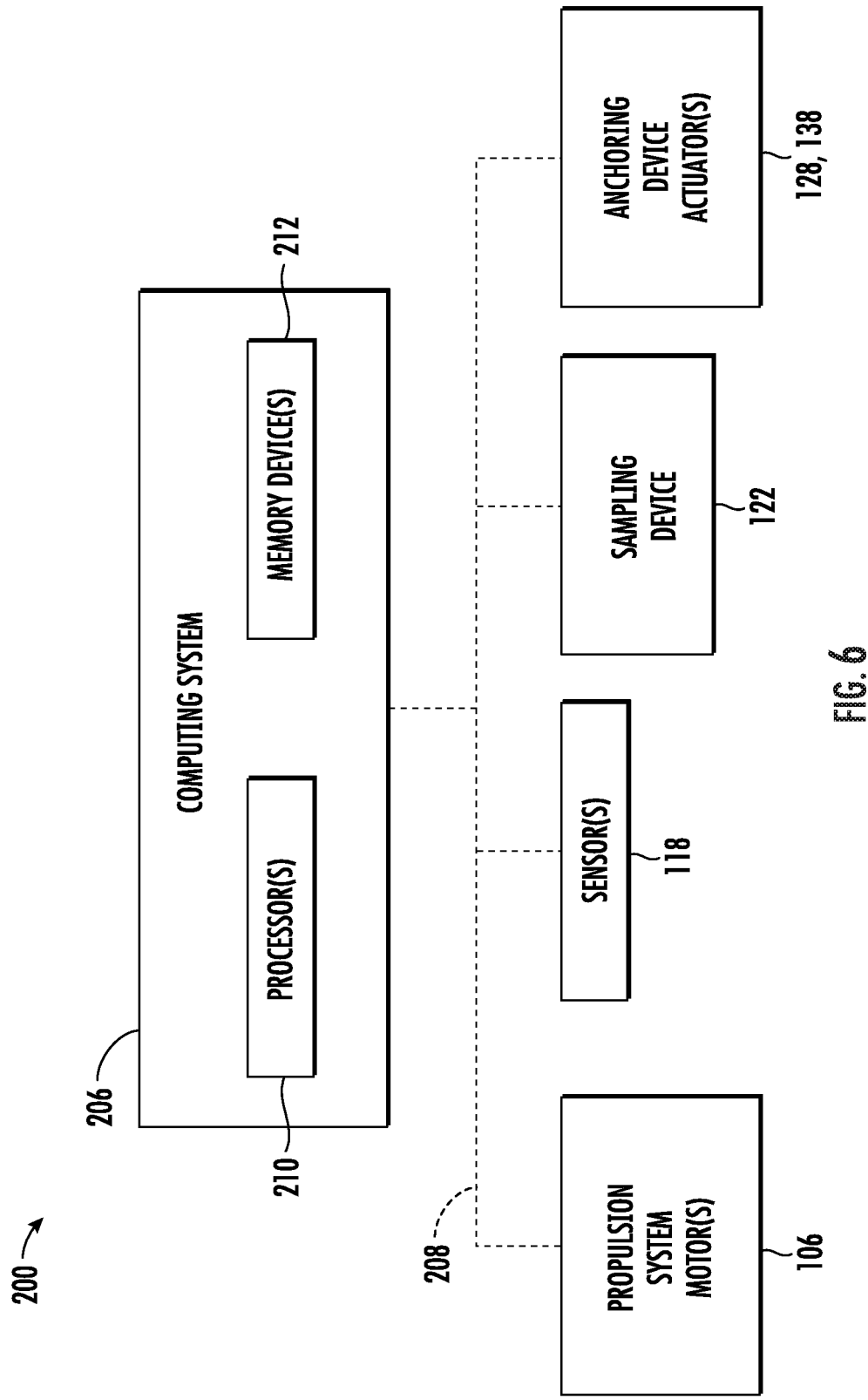
FIG. 6 illustrates a schematic view of one embodiment of a system for anchoring unmanned aerial vehicles to surfaces in accordance with aspects of the present subject matter.

Referring now to FIG. 6, a schematic view of one embodiment of a system 200 for anchoring unmanned aerial vehicles to surfaces is illustrated in accordance with aspects of the present subject matter. In general, the system 200 will be described herein with reference to the agricultural machine 10 and UAV 100 described above with reference to FIGS. 1-5. However, the disclosed system 200 may generally be utilized with agricultural machines having any other suitable machine configuration and/or UAVs having any other suitable vehicle configuration.

As shown in FIG. 6, the system 200 may include a computing system 206 communicatively coupled to one or more components of the agricultural machine 10 and/or the UAV 100 to allow the operation of such components to be electronically or automatically controlled by the computing system 206. For instance, the computing system 206 may be communicatively coupled to the propulsion system 104 of the UVA 100 (e.g., via a communicative link 208). As such, the computing system 206 may be configured to control the operation of the propulsion system 104 such that the UAV 100 takes off from a landing pad (e.g., the landing pad 202), flies across a field, and lands at a data collection point. Additionally, the computing system 206 may be configured to control the operation of the propulsion system 104 such that the UAV 100 takes off from the data collection point, flies across the field, and lands on the landing pad. Moreover, the computing system 206 may be communicatively coupled to the sensor(s) 118 and/or the soil sampling device 122 of the UAV 100 (e.g., via the communicative link 208). In this respect, the computing system 206 may be configured to control the such devices 118, 122 such that data indicative of one or more field characteristics and/or a soil sample is obtained when the UAV 100 has landed at a data collection point. Furthermore, the computing system 206 may be communicatively coupled to the anchoring device actuator(s) 128, 138 (e.g., via the communicative link 208). Thus, the computing system 206 may be configured to control the operation of the actuator(s) 128, 138 to anchor the UAV 100 to a landing pad (e.g., to secure the UAV 100 when not in use) or a field (e.g., to permit such data/sample collection). Additionally, the computing system 206 may be communicatively coupled to any other suitable components of the agricultural machine 10 and/or the UAV 100 (e.g., via the communicative link 208), such as to allow charging of a battery(ies) (not shown) of the UAV 100, data transfer between the UAV 100 and the agricultural machine 10, and/or the like.

In general, the computing system 206 may comprise one or more processor-based devices, such as a given controller or computing device or any suitable combination of controllers or computing devices. Thus, in several embodiments, the computing system 206 may include one or more processor(s) 210 and associated memory device(s) 212 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 212 of the computing system 206 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 212 may generally be configured to store suitable computer-readable instructions that, when implemented by the processor(s) 210, configure the computing system 206 to perform various computer-implemented functions, such as one or more aspects of the methods and algorithms that will be described herein. In addition, the computing system 206 may also include various other suitable components, such as a communications circuit or module, one or more input/output channels, a data/control bus and/or the like.

The various functions of the computing system 206 may be performed by a single processor-based device or may be distributed across any number of processor-based devices, in which instance such devices may be considered to form part of the computing system 206. For instance, the functions of the computing system 206 may be distributed across multiple application-specific controllers, such as an onboard UAV controller, an onboard agricultural machine controller (e.g., an engine controller, a transmission controller, an implement controller, and/or the like), a controller(s)/computing device(s) of a remote device(s) (e.g., a laptop or Smartphone), and/or the like.

Figure 7:
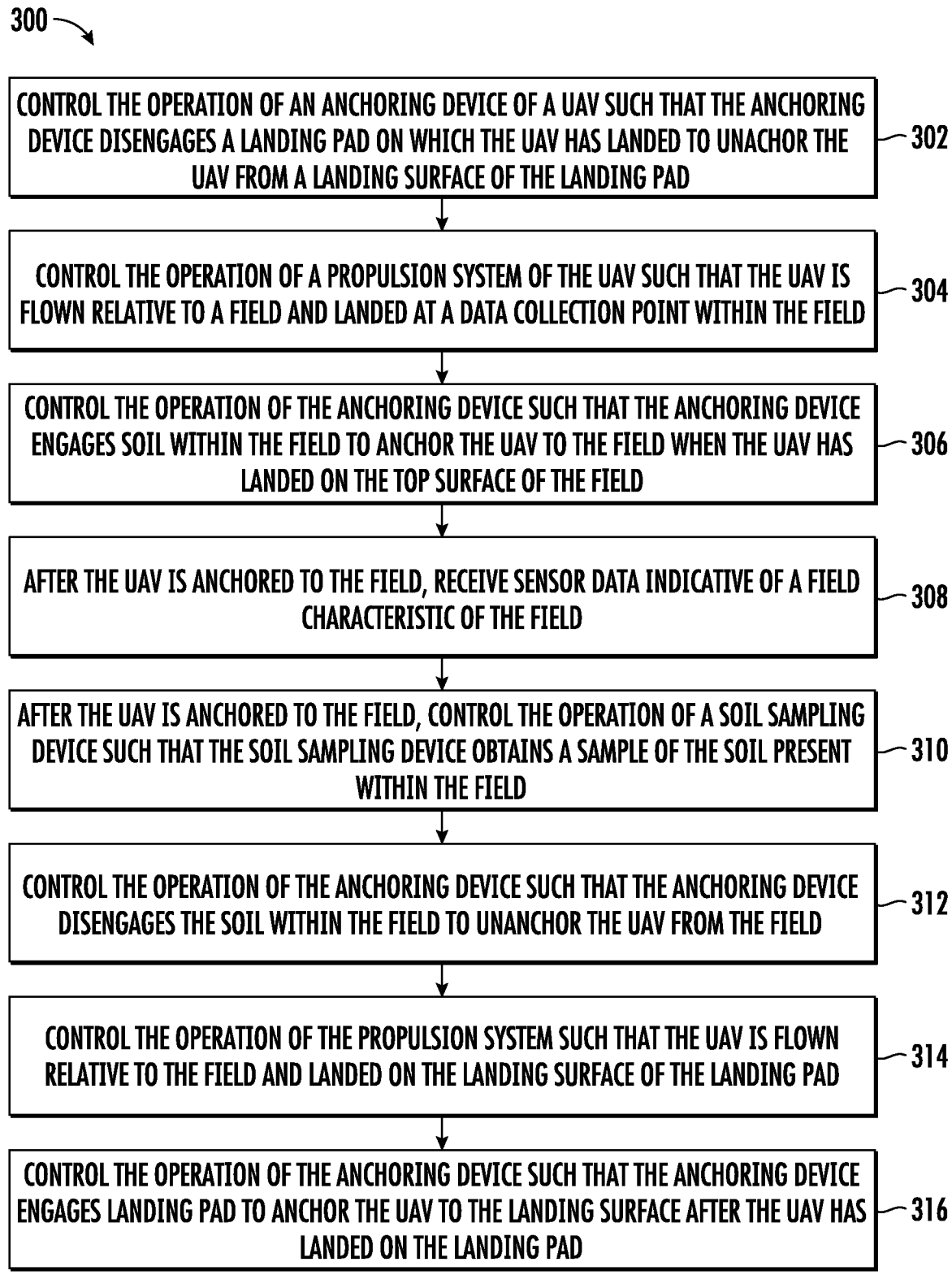
FIG. 7 illustrates a flow diagram of one embodiment of a method for anchoring unmanned aerial vehicles to surfaces in accordance with aspects of the present subject matter.

Referring now to FIG. 7, a flow diagram of one embodiment of a method 300 for anchoring unmanned aerial vehicles to surfaces is illustrated in accordance with aspects of the present subject matter. In general, the method 300 will be described herein with reference to the agricultural machine 10, the UAV 100, and the system 200 described above with reference to FIGS. 1-6. However, the disclosed method 300 may generally be implemented with any agricultural machines having any suitable machine configuration, UAVs having any suitable vehicle configuration, and/or within any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (302), the method 300 may include controlling, with a computing system including one or more computing devices, the operation of an anchoring device of a UAV such that the anchoring device disengages a landing pad on which the UAV has landed to unanchor the UAV from a landing surface of the landing pad. As described above, the UAV 100 may include one or more anchoring devices 124 configured to anchor or otherwise secure the UAV 100 to the landing 202 installed on the agricultural machine 10. In this respect, the computing system 206 may be configured to control the operation of the anchoring device actuator(s) 128, 138 such that the anchoring device(s) 124 disengage the landing pad 202, thereby unanchoring the UAV 100 from the landing surface 204. For example, in one embodiment, the anchoring device(s) 124 may be configured as a rotary device(s) having an auger(s) 126. In such an embodiment, the computing system 206 may be configured to control the operation of the anchoring device actuator(s) 128 such that the auger(s) 126 are rotated relative to the landing pad 202 to disengage the landing pad 202. In another embodiment, the anchoring device(s) 124 may include an arcuate member(s). In such an embodiment, the computing system 206 may be configured to control the operation of the anchoring device actuator(s) 138 such that arcuate member(s) 132 is moved from a second position at which the arcuate member 132(s) engages the cavity(ies) 140 defined by the landing pad 202 to a first position at which the arcuate member(s) 132 is disengaged from the landing pad 202. However, in alternative embodiments, the computing system 206 may be configured to control the operation of any other suitable device(s) such that the anchoring device(s) 124 of the UAV 100 disengages the landing pad 202.

Additionally, at (304), the method 300 may include controlling, with the computing system, the operation of a propulsion system of the UAV such that the UAV is flown relative to a field and landed at a data collection point within the field. For instance, as described above, the computing system 206 may be configured to control the operation of the propulsion system motor(s) 106 of the UAV 100 such that the UAV 100 takes off from the landing pad 202, flies relative to the field across which the agricultural machine 10 is traveling, and lands at a data collection point within the field.

Moreover, as shown in FIG. 7, at (306), the method 300 may include controlling, with the computing system, the operation of the anchoring device such that the anchoring device engages soil within the field to anchor the UAV to the field when the UAV has landed on the top surface of the field. More specifically, after the UAV 100 has landed at the data collection point, the computing system 206 may be configured to control the operation of the anchoring device actuator(s) 128, 138 such that the anchoring device(s) 124 engages the soil within the field to anchor the UAV 100 to the field. For example, as mentioned above, in one embodiment, the anchoring device(s) 124 may be configured as a rotary device(s) having an auger(s) 126. In such an embodiment, the computing system 206 may be configured to control the operation of the anchoring device actuator(s) 128 such that the auger(s) 126 is rotated relative to the soil to engage the field. Additionally, as mentioned above, in another embodiment, the anchoring device(s) 124 may include an arcuate member(s) 132. In such an embodiment, the computing system 206 may be configured to control the operation of the anchoring device actuator(s) 138 such that arcuate member(s) 132 is moved from the first position at which the arcuate member(s) 132 is disengaged from the landing pad 202 and the field to the second position at which the arcuate member 132(s) penetrates the top surface of the field and engages the soil within the field. However, in alternative embodiments, the computing system 206 may be configured to control the operation of any other suitable device(s) such that the anchoring device(s) 124 of the UAV 100 engages the field.

Furthermore, after the UAV is anchored to the field, at (308), the method 300 may include receiving, with the computing system, sensor data indicative of a field characteristic of the field. As described above, the UAV 100 may include one or more sensors 118 supported thereon. The sensor(s) 118 may, in turn, include a pin(s) or a probe-like device(s) that pierces the top surface of the field and penetrates into the soil. During such penetration, the anchoring device(s) 124 may prevent the UAV 100 from lifting of the top surface of the field. Once the sensor(s) 118 penetrate into the soil, the sensor(s) 118 may capture data indicative of one or more characteristics of the field, such as the soil hardness, soil moisture, seedbed surface profile, seedbed depth, and/or the like. Thereafter, the computing system 206 may be configured to receive the captured data from the sensor(s) 118 (e.g., via the communicative link 208).

In addition, as shown in FIG. 7, after the UAV is anchored to the field, at (310), the method 300 may include controlling, with the computing system, an operation of a soil sampling device such that the soil sampling device obtains a sample of the soil present within the field. As described above, the UAV 100 may include a soil sampling device 122. In this respect, the computing system 206 may be configured to control the operation of the soil sampling device 122 (e.g., one or more actuators (not shown) of the device 122) such that the device 122 engages the soil to obtain a quantity or sample of the soil from the field. During such soil engagement, the anchoring device(s) 124 may prevent the UAV 100 from lifting of the top surface of the field.

Further, at (312), the method 300 may include controlling, with the computing system, the operation of the anchoring device such that the anchoring device disengages the soil within the field to unanchor the UAV from the field. More specifically, after the field characteristic data has been captured and/or the soil sample has been obtained, the computing system 206 may be configured to control the operation of the anchoring device actuator(s) 128, 138 such that the anchoring device(s) 124 disengages the soil within the field, thereby unanchoring the UAV 100 from the top surface of the field. For example, as mentioned above, in one embodiment, the anchoring device(s) 124 may be configured as a rotary device(s) having an auger(s) 126. In such an embodiment, the computing system 206 may be configured to control the operation of the anchoring device actuator(s) 128 such that the auger(s) 126 is rotated relative to the soil to disengage the soil. Additionally, as mentioned above, in another embodiment, the anchoring device(s) 124 may include an arcuate member(s). In such an embodiment, the computing system 206 may be configured to control the operation of the anchoring device actuator(s) 138 such that arcuate member(s) 132 is moved from the second position at which the arcuate member 132(s) engages the soil to the first position at which the arcuate member(s) 138 disengages the soil. However, in alternative embodiments, the computing system 206 may be configured to control the operation of any other suitable device(s) such that the anchoring device(s) 124 of the UAV 100 disengages the soil within the field.

Moreover, as shown in FIG. 7, at (314), the method 300 may include controlling, with the computing system, the operation of the propulsion system such that the UAV is flown relative to the field and landed on the landing surface of the landing pad. For instance, as described above, the computing system 206 may be configured to control the operation of the propulsion system motor(s) 106 of the UAV 100 such that the UAV 100 takes off from the field, flies relative to the field across which the agricultural machine 10 is traveling, and lands at on the landing surface 204 of the landing pad 202.

In addition, at (316), the method 300 may include controlling, with the computing system, the operation of the anchoring device such that the anchoring device engages landing pad to anchor the UAV to the landing surface after the UAV has landed on the landing pad. More specifically, after the UAV 100 has landed on the landing pad 202, the computing system 206 may be configured to control the operation of the anchoring device actuator(s) 128, 138 such that the anchoring device(s) 124 engages landing pad 202 to anchor the UAV 100 to the landing surface 204. For example, as mentioned above, in one embodiment, the anchoring device(s) 124 may be configured as a rotary device(s) having an auger(s) 126. In such an embodiment, the computing system 206 may be configured to control the operation of the anchoring device actuator(s) 128 such that the auger(s) 126 is rotated relative to the landing pad 202 to engage the landing pad 202. Additionally, as mentioned above, in another embodiment, the anchoring device(s) 124 may include an arcuate member(s) 132. In such an embodiment, the computing system 206 may be configured to control the operation of the anchoring device actuator(s) 138 such that arcuate member(s) 132 is moved from the first position at which the arcuate member(s) is disengaged from the landing pad 202 and the field to the second position at which the arcuate member 132(s) engages the cavity(ies) 140 defined by the landing pad 202. However, in alternative embodiments, the computing system 206 may be configured to control the operation of any other suitable device(s) such that the anchoring device(s) 124 of the UAV 100 engages the landing pad 202.

In several embodiments, the captured sensor data and/or collected soil samples may be used during the operation of the agricultural machine 10. More specifically, in such embodiments, the above-described method 300 may be performed while the agricultural machine 10 is traveling across the field to perform an agricultural operation (e.g., a tillage operation) thereon. In this respect, the sensor data/soil samples may be used as an onboard ground-truthing assistant to determine and/or verify characteristics of the field, such as the seedbed floor depth, the soil moisture, the soil hardness, and/or the like. Moreover, the sensor data/soil samples may be used to adjust one or more operating parameters of the agricultural machine 10, such as the ground speed of the machine 10, the force applied to a tool(s) of the machine 10, the penetration depth of a tool(s) of machine 10, and/or the like. Additionally, in one embodiment, the UAV 100 may identify obstacles (e.g., rocks, standing water, excessively wet spots, and/or the like) within the field at the data collection point(s). In such an embodiment, the operation of the agricultural machine 10 may be controlled such that the machine 10 avoids the identified obstacles.

It is to be understood that the steps of the method 300 are performed by the computing system 206 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 206 described herein, such as the method 300, is implemented in software code or instructions which are tangibly stored on a tangible computer readable medium. The computing system 206 loads the software code or instructions via a direct interface with the computer readable medium or via a wired and/or wireless network. Upon loading and executing such software code or instructions by the computing system 206, the computing system 206 may perform any of the functionality of the computing system 206 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for anchoring unmanned aerial vehicles to surfaces, the system comprising:
a landing pad configured to be installed on an agricultural machine, the landing pad defining a landing surface; and
an unmanned aerial vehicle (UAV) configured to land on the landing surface and a top surface of a field across which the agricultural machine is traveling, the UAV including a body and a plurality of legs coupled to the body, the plurality of legs configured to support the body relative to the landing surface or the top surface of the field when the UAV is in a landed position, the UAV further including an anchoring device configured to engage soil within the field to anchor the UAV to the field when the UAV has landed on the top surface of the field, wherein the anchoring device is further configured to engage the landing pad to anchor the UAV to the landing surface while the agricultural machine is traveling across the field when the UAV has landed on the landing pad.

2. The system of claim 1, wherein the anchoring device comprises an auger configured to rotationally engage the soil within the field and the landing pad.

3. The system of claim 2, wherein the anchoring device comprises an actuator configured to rotationally drive the auger.

4. The system of claim 2, wherein each leg of the plurality of legs comprises a proximal end coupled to the body and a distal end, the anchoring device comprising a plurality of anchoring devices, each anchoring device of the plurality of anchoring devices being installed on the distal end of one leg of the plurality of legs.

5. The system of claim 1, wherein the anchoring device comprises an arcuate member configured to engage the soil within the field and the landing pad.

6. The system of claim 5, wherein the anchoring device comprises an actuator configured to move the arcuate member between a first position at which the arcuate member engages the soil within the field or the landing pad and a second position at which the arcuate member is disengaged from the soil within the field and the landing pad.

7. The system of claim 5, wherein the arcuate member extends between a proximal end coupled to the body of the UAV and a distal end, the distal end defining a tip configured to penetrate the top surface of the field.

8. The system of claim 1, wherein the landing pad defines a cavity configured to receive a portion of the anchoring device.

9. The system of claim 8, wherein a portion of the landing pad defining the cavity is magnetic.

10. The system of claim 1, further comprising:
a computing system configured to control the operation of the UAV while the agricultural machine is traveling across the field, the UAV further comprising a sensor communicatively coupled to the computing system, the sensor configured to capture data indicative of a field characteristic of the field.

11. The system of claim 1, wherein the UAV further includes a soil sampling device configured to obtain a sample of the soil present within the field.

12. A method for anchoring unmanned aerial vehicles to surfaces, the method comprising:
controlling, with a computing system comprising one or more computing devices, an operation of an anchoring device of a UAV such that the anchoring device disengages a landing pad installed on an agricultural vehicle on which the UAV has landed to unanchor the UAV from a landing surface of the landing pad while the agricultural vehicle is moving across a field;
controlling, with the computing system, an operation of a propulsion system of the UAV such that the UAV is flown relative to the field and landed at a data collection point within the field; and
controlling, with the computing system, the operation of the anchoring device such that the anchoring device engages soil within the field to anchor the UAV to the field when the UAV has landed on the top surface of the field.

13. The method of claim 12, further comprising:
after the UAV is anchored to the field, receiving, with the computing system, sensor data indicative of a field characteristic of the field.

14. The method of claim 13, further comprising:
controlling, with the computing system, the operation of the anchoring device such that the anchoring device disengages the soil within the field to unanchor the UAV from the field;
controlling, with the computing system, the operation of the propulsion system such that the UAV is flown relative to the field and landed on the landing surface of the landing pad; and
controlling, with the computing system, the operation of the anchoring device such that the anchoring device engages landing pad to anchor the UAV to the landing surface after the UAV has landed on the landing pad.

15. The method of claim 12, further comprising:
after the UAV is anchored to the field, controlling, with the computing system, an operation of a soil sampling device such that the soil sampling device obtains a sample of the soil present within the field.

16. The method of claim 12, wherein the anchoring device comprises an auger configured to rotationally engage the soil within the field and the landing pad.

17. The method of claim 16, wherein controlling the operation of the anchoring device comprises controlling, with the computing system, the operation of an actuator to rotationally drive the auger.

18. The method of claim 12, wherein the anchoring device comprises an arcuate member configured to engage the soil within the field and the landing pad.

19. The method of claim 18, wherein controlling the operation of the anchoring device comprises controlling, with the computing system, the operation of an actuator to move the arcuate member between a first position at which the arcuate member engages the soil within the field or the landing pad and a second position at which the arcuate member is disengaged from the soil within the field and the landing pad.

20. The method of claim 12, wherein the landing pad defines a cavity configured to receive a portion of the anchoring device.

* * * * *